(12) United States Patent
Kent (10) Patent No.: US 8,174,958 B2
(45) Date of Patent: *May 8, 2012

(54) METHOD AND SYSTEM FOR A REFERENCE SIGNAL (RS) TIMING LOOP FOR OFDM SYMBOL SYNCHRONIZATION AND TRACKING

(75) Inventor: Mark Kent, Vista, CA (US)

(73) Assignee: Broadcom Corporation, Irvine, CA (US)

(*) Notice: Subject to any disclaimer, the term of this patent is extended or adjusted under 35 U.S.C. 154(b) by 397 days.

This patent is subject to a terminal disclaimer.

(21) Appl. No.: 12/184,383

(22) Filed: Aug. 1, 2008

(65) Prior Publication Data

US 2010/0027499 A1 Feb. 4, 2010

(51) Int. Cl.
*H04J 11/00* (2006.01)

(52) U.S. Cl. .......................... 370/208; 370/210; 370/503

(58) Field of Classification Search .................. 370/203, 370/204, 206, 208, 209, 210, 503, 516, 330, 370/336

See application file for complete search history.

(56) References Cited

U.S. PATENT DOCUMENTS

| | | | | |
|---|---|---|---|---|
| 6,658,063 | B1* | 12/2003 | Mizoguchi et al. | 375/260 |
| 7,012,881 | B2* | 3/2006 | Kim | 370/208 |
| 7,218,691 | B1* | 5/2007 | Narasimhan | 375/344 |
| 7,248,652 | B2* | 7/2007 | Sayeed | 375/343 |
| 7,251,283 | B2* | 7/2007 | Chen | 375/260 |
| 7,457,231 | B2* | 11/2008 | Vijayan et al. | 370/208 |
| 7,539,125 | B2* | 5/2009 | Kao et al. | 370/208 |
| 2002/0041637 | A1* | 4/2002 | Smart et al. | 375/316 |
| 2002/0097669 | A1* | 7/2002 | Kim | 370/208 |
| 2003/0016773 | A1* | 1/2003 | Atungsiri et al. | 375/355 |
| 2003/0026201 | A1* | 2/2003 | Arnesen | 370/210 |
| 2003/0058951 | A1* | 3/2003 | Thomson et al. | 375/260 |
| 2004/0190560 | A1* | 9/2004 | Maltsev et al. | 370/503 |
| 2005/0186956 | A1* | 8/2005 | Grindahl et al. | 455/422.1 |
| 2005/0213680 | A1* | 9/2005 | Atungsiri et al. | 375/260 |
| 2005/0249181 | A1* | 11/2005 | Vijayan et al. | 370/344 |
| 2005/0286485 | A1* | 12/2005 | Golden et al. | 370/350 |
| 2006/0221810 | A1* | 10/2006 | Vrcelj et al. | 370/208 |
| 2006/0245349 | A1* | 11/2006 | Vrcelj et al. | 370/210 |
| 2007/0183514 | A1* | 8/2007 | Iancu et al. | 375/260 |
| 2008/0088082 | A1* | 4/2008 | Iino et al. | 271/214 |
| 2008/0267273 | A1* | 10/2008 | Aue | 375/224 |
| 2008/0279131 | A1* | 11/2008 | Malladi et al. | 370/311 |
| 2009/0041240 | A1* | 2/2009 | Parkvall et al. | 380/247 |
| 2009/0245214 | A1* | 10/2009 | Mudulodu et al. | 370/338 |
| 2009/0279422 | A1* | 11/2009 | Fonseka et al. | 370/215 |
| 2010/0027499 | A1* | 2/2010 | Kent | 370/330 |
| 2010/0027691 | A1* | 2/2010 | Kent | 375/260 |
| 2010/0166050 | A1* | 7/2010 | Aue | 375/224 |

* cited by examiner

*Primary Examiner* — Chi H. Pham
*Assistant Examiner* — Kevin Mew
(74) *Attorney, Agent, or Firm* — Sterne, Kessler, Goldstein & Fox P.L.L.C.

(57) ABSTRACT

Aspects of a method and system for a reference signal (RS) timing loop for OFDM symbol synchronization and tracking may include tracking symbol timing in an Orthogonal Frequency Division Multiplexing (OFDM) signal based on at least a reference symbol set. A receiver timing may be adjusted based on at least the symbol timing. The symbol timing may be tracked by generating an output signal as a function of a guard time $\Delta t_g$ in a phase discrimination feedback loop. The reference symbol (RS) set may be generated in an RS extraction module or circuit, from at least a fast Fourier transform of the received OFDM signal. The receiver timing may be coarsely adjusted and then finely adjusted. The coarse receiver timing adjustment may be based on processing at least a primary synchronization signal and a secondary synchronization signal.

24 Claims, 7 Drawing Sheets

METHOD AND SYSTEM FOR A REFERENCE SIGNAL (RS) TIMING LOOP FOR OFDM SYMBOL SYNCHRONIZATION AND TRACKING

CROSS-REFERENCE TO RELATED APPLICATIONS/INCORPORATION BY REFERENCE

This application makes reference to:
U.S. application Ser. No. 12/184,353, filed on even date herewith; and
U.S. application Ser. No. 12/184,410, filed on even date herewith.

Each of the above referenced applications is hereby incorporated herein by reference in its entirety.

FIELD OF THE INVENTION

Certain embodiments of the invention relate to signal processing for communication systems. More specifically, certain embodiments of the invention relate to a method and system for a reference signal (RS) timing loop for OFDM symbol synchronization and tracking.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communications data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for reference signal (RS) timing loop for OFDM symbol synchronization and tracking, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for RS timing loop for OFDM symbol synchronization and tracking. Aspects of the method and system for a reference signal (RS) timing loop for OFDM symbol synchronization and tracking may comprise tracking symbol timing in an Orthogonal Frequency Division Multiplexing (OFDM) signal based on at least a reference symbol set. A receiver timing may be adjusted based on at least the symbol timing.

The symbol timing may be tracked by generating an output signal as a function of a guard time $\Delta t_g$ in a phase discrimination feedback loop. The reference symbol (RS) set may be generated in an RS extraction module or circuit, from at least a fast Fourier transform of the received OFDM signal. The receiver timing may be coarsely adjusted and then finely adjusted. The coarse receiver timing adjustment may be achieved based on processing at least a primary synchronization signal and a secondary synchronization signal. The reference symbol set may comprise a plurality of time-frequency slots. The plurality of time-frequency slots may change according to a frequency shift and PN sequence that may modulate the reference symbols. The PN generated sequences may be determined by base station identifier. This base station identifier may be determined by the primary synchronization signal (PSS) and secondary synchronization signal (SSS). The OFDM signal may conform to a Universal Mobile Telecommunications Standards (UMTS) long-term evolution (LTE) signal. The adjustment of the receiver timing may be controlled via a receiver timing generator.

Figure 1A:
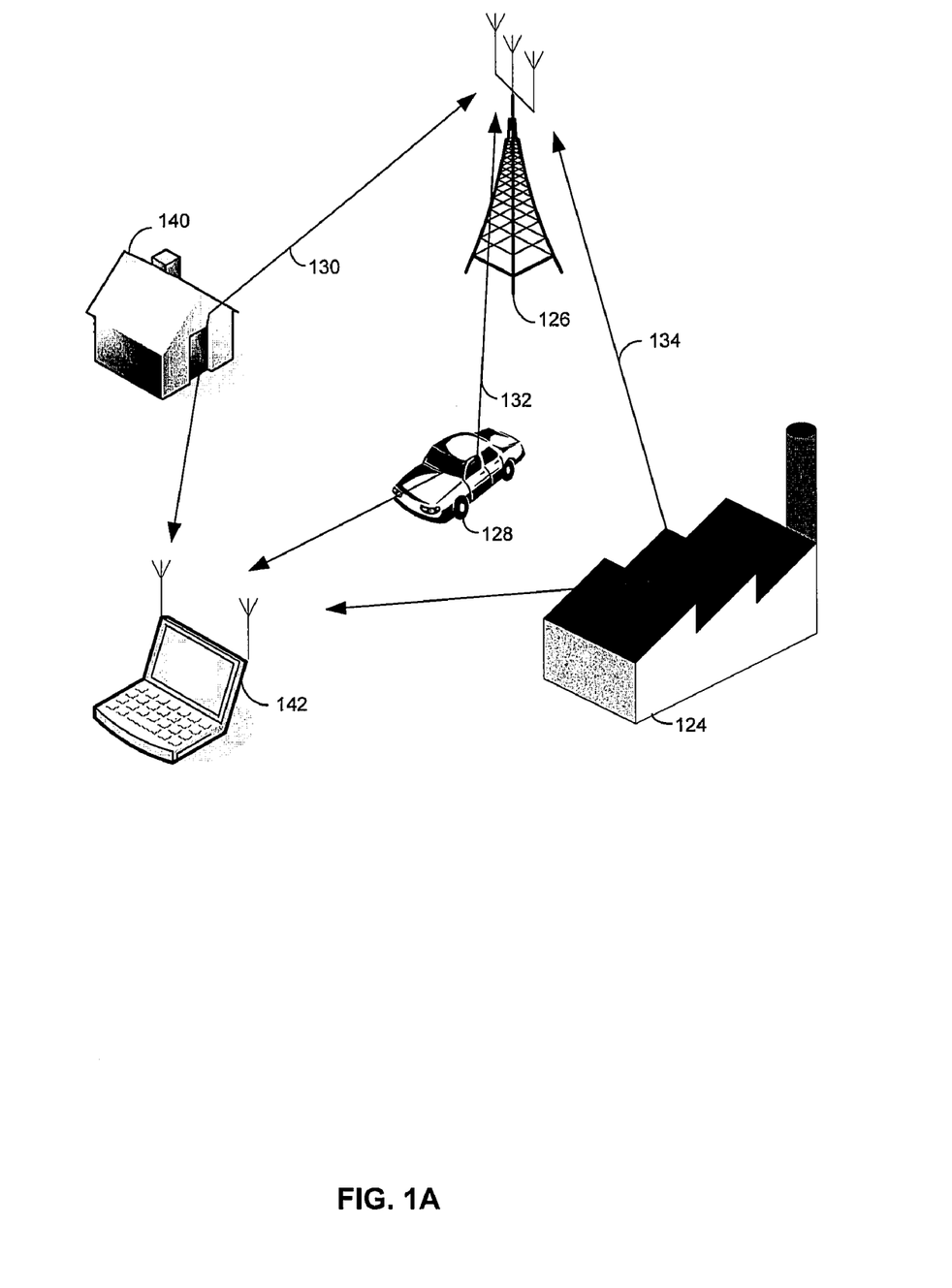
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a building 140 such as a house or office, a mobile terminal 142, a factory 124, a base station 126, a car 128, and communication paths 130, 132 and 134.

The base station 126 and the mobile terminal 142 may comprise suitable logic, circuitry and/or code that may be enabled to generate and process MIMO communication signals.

Wireless communications between the base station 126 and the mobile terminal 142 may take place over a wireless channel. The wireless channel may comprise a plurality of communication paths, for example, the communication paths 130, 132 and 134. The wireless channel may change dynamically as the mobile terminal 142 and/or the car 128 moves. In some cases, the mobile terminal 142 may be in line-of-sight (LOS) of the base station 126. In other instances, there may not be a direct line-of-sight between the mobile terminal 142 and the base station 126 and the radio signals may travel as reflected communication paths between the communicating entities, as illustrated by the exemplary communication paths 130, 132 and 134. The radio signals may be reflected by man-made structures like the building 140, the factory 124 or the car 128, or by natural obstacles like hills. Such a system may be referred to as a non-line-of-sight (NLOS) communications system.

Signals communication by the communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 142. The communication paths 130, 132 and 134 may also be differently attenuated. In the downlink, for example, the received signal at the mobile terminal 142 may be the sum of differently attenuated communication paths 130, 132 and/or 134 that may not be synchronized and that may dynamically change. Such a channel may be referred to as a fading multipath channel.

A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 142, in particular for NLOS signals. Furthermore, Orthogonal Frequency Division Multiplexing (OFDM) systems may be suitable for wireless systems with multipath.

Figure 1B:
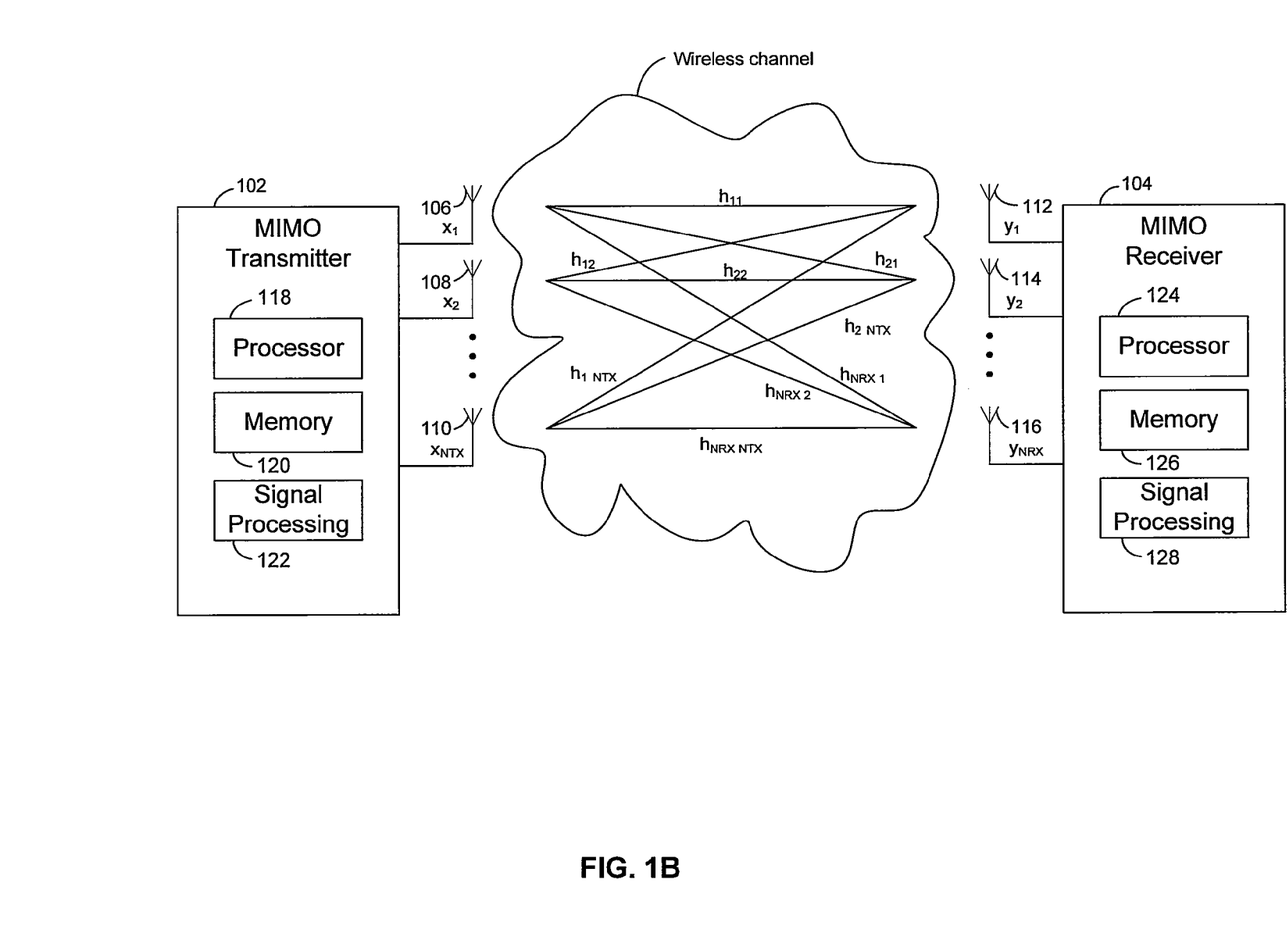
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. The MIMO transmitter 102 may comprise a processor block 118, a memory block 120, and a signal processing block 122. The MIMO receiver 104 may comprise a processor block 124, a memory block 126, and a signal processing block 128. There is also shown a wireless channel comprising communication paths $h_{11}$, $h_{12}$, $h_{22}$, $h_{21}$, $h_{2\,NTX}$, $h_{1\,NTX}$, $h_{NRX\,1}$, $h_{NRX\,2}$, $h_{NRX\,NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$ i∈{1, 2, ... $N_{TX}$} that may be transmitted by the transmit antennas, of which the antennas 106, 108 and 110 may be depicted in FIG. 1B. The processor block 118 may comprise suitable logic, circuitry, and/or code that may be enabled to process signals. The memory block 120 may comprise suitable logic, circuitry, and/or code that may be enabled to store and/or retrieve information for processing in the MIMO transmitter 102. The signal processing block 122 may comprise suitable logic, circuitry and/or code that may be enabled to process signals, for example in accordance with one or more MIMO transmission protocols. The MIMO receiver 104 may comprise suitable logic, circuitry and/or code that may be enabled to process the receive symbols $y_i$ i∈{1, 2, ... $N_{RX}$} that may be received by the receive antennas, of which the antennas 112, 114 and 116 may be shown in FIG. 1B. The processor block 124 may comprise suitable logic, circuitry, and/or code that may be enabled to process signals. The memory block 126 may comprise suitable logic, circuitry, and/or code that may be enabled to store and/or retrieve information for processing in the MIMO receiver 104. The signal processing block 128 may comprise suitable logic, circuitry and/or code that may be enabled to process signals, for example in accordance with one or more MIMO protocols. An input-output relationship between the transmitted and the received signal in a MIMO system may be written as:

$$y = Hx + n$$

where $y=[y_1, y_2, \ldots y_{NRX}]^T$ may be a column vector with $N_{RX}$ elements, $.^T$ may denote a vector transpose, $H=[h_{ij}]$:i∈{1, 2, ... $N_{RX}$}; j∈{1, 2, ... $N_{TX}$} may be a channel matrix of dimensions $N_{RX}$ by $N_{TX}$, $x=[x_1, x_2, \ldots x_{NTX}]^T$ is a column vector with $N_{TX}$ elements and n is a column vector of noise samples with $N_{RX}$ elements.

The system diagram in FIG. 1B may illustrate an exemplary multi-antenna system as it may be utilized in a Universal Mobile Telecommunication System (UMTS) Long-Term Evolution (LTE) system. Over each of the NTX transmit antennas, a symbol stream, for example $x_1(t)$ over antenna 106, may be transmitted. A symbol stream, for example $x_1(t)$, may comprise one or more symbols, wherein each symbol may be modulated onto a different sub-carrier. OFDM systems may generally use a relatively large number of subcarriers in parallel, for each symbol stream. For example, a symbol stream $x_1(t)$ may comprise symbols on carriers $f_m$:m∈{1, 2, ... M}, and M may be a subset of the FFT size that may be utilized at the receiver. For instance, with FFT sizes of N, M<N and may create guard-tones that may allow utilization of variable bandwidth when deployed. The M sub-carriers may comprise a symbol stream $x_1(t)$, for example, that may occupy a bandwidth of a few kilohertz to a few megahertz. Common bandwidth may be between 1 MHz and up to 100 MHz, for example. Thus, each symbol stream may comprise one or more sub-carriers, and for each sub-carrier a wireless channel may comprise multiple transmission paths. For example, a wireless channel $h_{12}$ from transmit antenna 108 to receive antenna 112, as illustrated in the figure, may be multi-dimensional. In particular, the wireless channel $h_{12}$ may comprise a temporal impulse response, comprising one or more multipath components. The wireless channel $h_{12}$ may also comprise a different temporal impulse response for each sub-carrier $f_m$ of the symbol stream, for example $x_2(t)$. Finally, the wireless channels as illustrated in FIG. 1B depict a spatial dimension of the wireless channel because the transmitted signal from each transmit antenna may be received differently at each receiver antenna. Thus, a channel impulse response may be measured and/or estimated for each subcarrier.

Figure 2:
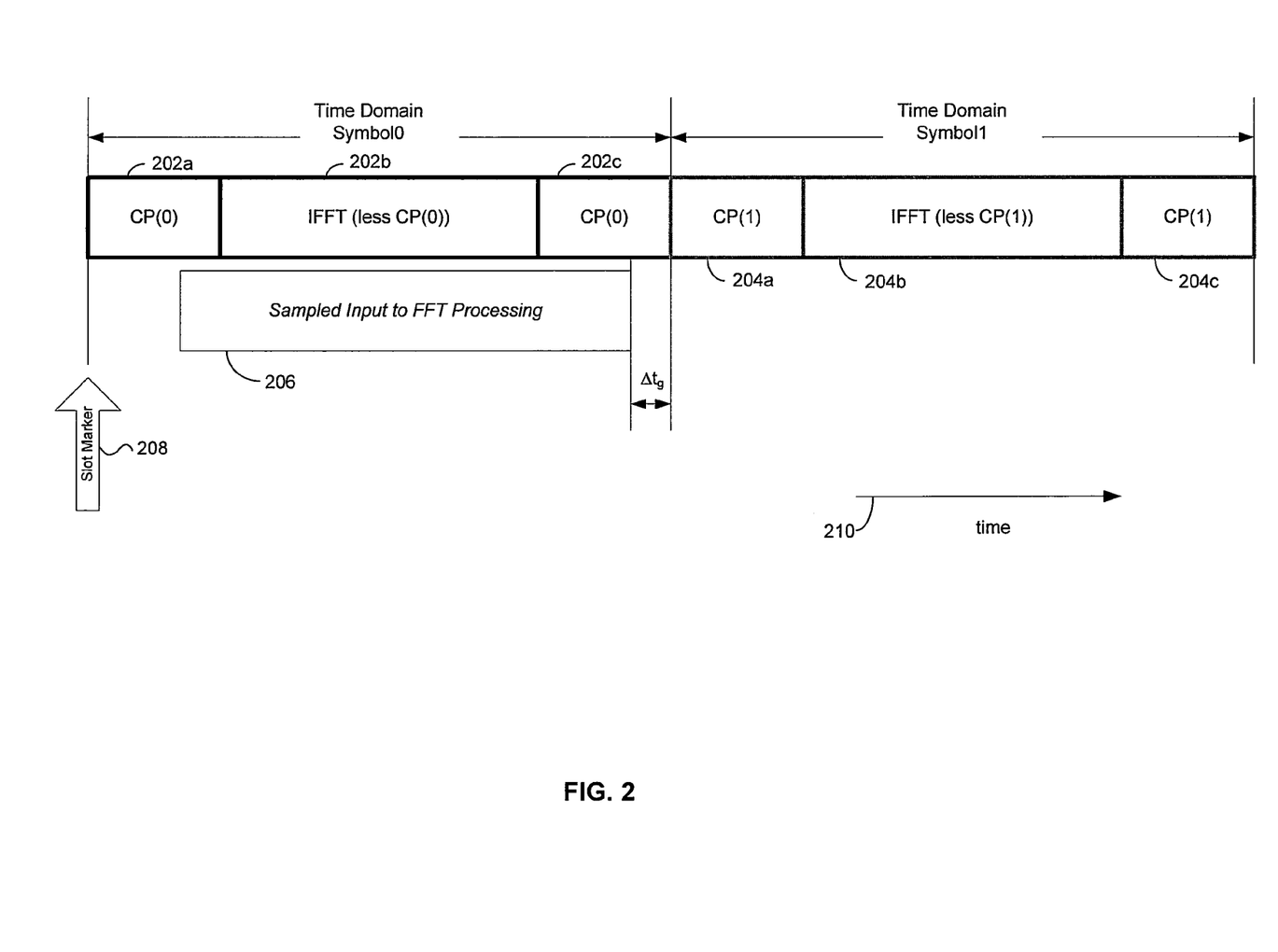
FIG. 2 is a diagram illustrating an exemplary OFDM symbol stream, in accordance with an embodiment of the invention.

FIG. 2 is an illustration of an exemplary OFDM symbol stream, in accordance with an embodiment of the invention. Referring to FIG. 2, there is shown a time axis 210; a time domain symbol 0 comprising a cyclic prefix CP(0) 202a, an Inverse Fast Fourier Transform (IFFT) symbol less CP(0) (IFFT(0)) 202b, and a cyclic prefix CP(0) 202c; a time domain symbol 1 comprising a cyclic prefix CP(1) 204a, an IFFT symbol less CP(1) (IFFT(0)) 204b, and a cyclic prefix CP(1) 204c. The IFFT(0) 202b and the CP(0) 202c may together form a complete IFFT symbol for time domain symbol 0. The CP(0) 202a may be substantially similar to CP(0) 202c. Similarly, the IFFT(1) 204b and the CP(1) 204c may together form a complete IFFT symbol for time domain symbol 1, and CP(1) 202a may be substantially similar to CP(1) 202c. There is also shown an FFT input window 206, a guard time $\Delta t_g$, and a slot marker 208. An LTE slot structure, for example, may comprise 3, 6, or 7 OFDM symbols per slot (two of which may be illustrated in FIG. 2).

To generate an Orthogonal Frequency Division Multiplexing (OFDM) symbol, an output of an IFFT comprising of IFFT(0) 202b and CP(0) 202c may be used to generate CP(0) 202a from CP(0) 202c, and append it to IFFT(0) 202b. The cyclic prefix CP(0) 202 may be utilized to avoid inter-symbol interference at an OFDM receiver, in the presence of multipath propagation in the wireless channel.

At an OFDM receiver, for example MIMO receiver 104, a sampled input signal may be processed for each received symbol, for example over an FFT input window 206. In order to decode the received symbols, it may be desirable that the FFT input window 206 may be located in a time domain symbol time slot, for example in time domain symbol 0. In particular, it may be desirable that the FFT input window 206 may not extend into a neighboring symbol, to avoid inter-symbol interference. Thus, the slot marker may indicate the beginning of a slot, for example time domain symbol slot 0, as illustrated in FIG. 2. The slot marker 208 together with $\Delta t_g$ may define the position of the FFT input window 206 within a symbol slot. In most instances, to keep interference due to the multipath channel as low as possible at the receiver, it may be desirable to keep $\Delta t_g$ small.

Thus, it may be desirable to acquire symbol level timing, and maintain it as it may drift, for example, because of changes in propagation due to mobility. In some instances, this may be combined with other timing level acquisition and tracking, for example frame synchronization. In many instances, synchronization via the Primary Synchronization Signal (PSS) and the Secondary Synchronization Signal (SSS) may be obtained by other means. Symbol timing may be acquired by a timing acquisition and tracking system, which may exploit reference signals (RS) embedded in an OFDM signal. Reference symbols may be known symbols that may be transmitted according to a known pattern over the time, frequency and spatial resources in an OFDM system. In other words, reference symbols may be transmitted at known timing instances, on known OFDM carriers over certain antennas. By decoding and processing RS symbols, the receiver may determine correct timing information, for example, through coherent demodulation. RS symbols may be transmitted from each antenna in a multiple antenna OFDM system.

In the Enhanced Universal Terrestrial Radio Access (EUTRA) interface, RS symbols may be generated based on cell-specific hopping pattern, and may comprise pseudo-noise (PN) covered sequences of Reference symbols. In accordance with an embodiment of the invention, the RS tone spacing may be 6 carriers, per transmit antenna, for example. In accordance with various embodiments of the invention, the RS tone spacing may be 2, or 4 carriers, for example. The RS sequence may not be known to the mobile terminal (user equipment, UE) during initial acquisition, for example through the synchronization signals. In some instances, after acquiring the primary synchronization signal (PSS) and the secondary synchronization signal (SSS), the UE may have obtained the cell-specific hopping pattern for the RS symbols, and the PN covering sequence. This information may be used to obtain a coarse frame timing. In accordance with various embodiments of the invention, the RS symbols may then be decoded in a timing acquisition and tracking block to provide fine timing and tracking. Thus, for example Universal Mobile Telecommunication System (UMTS) Long-term evolution (LTE) may employ a three step process for timing recovery. The three step process may comprise: a) recovering slot timing from the PSS; b) recovering frame timing from the SSS; and c) obtaining an estimation of estimation of timing offset and tracking from the RS symbols.

Figure 3A:
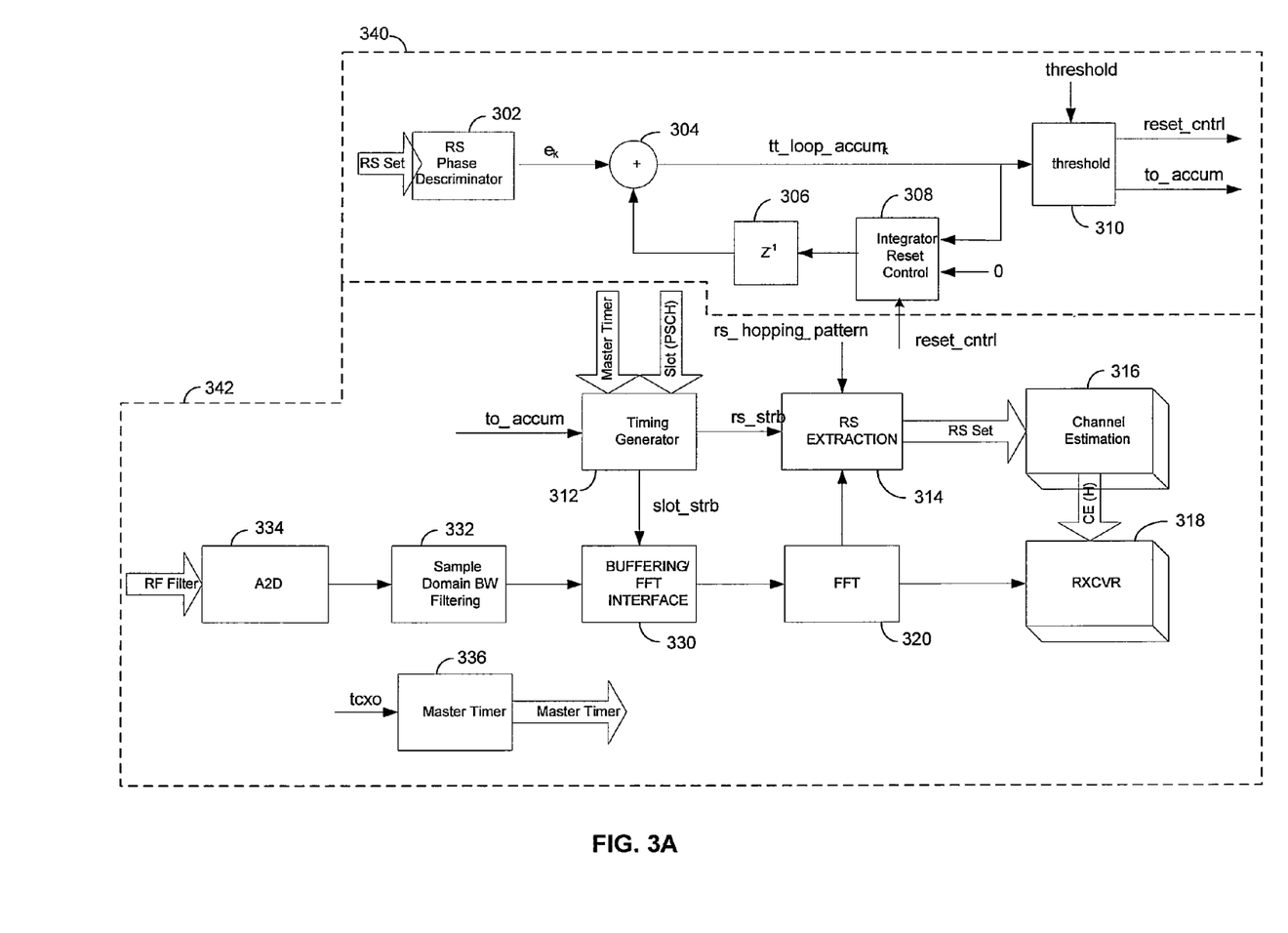
FIG. 3A is a diagram of an exemplary OFDM timing acquisition and tracking system, in accordance with an embodiment of the invention.

FIG. 3A is a diagram of an exemplary OFDM timing acquisition and tracking system, in accordance with an embodiment of the invention. Referring to FIG. 3A, there is shown a common receiver part 342, and a timing part 340. The timing part 340 may comprise an RS phase discriminator 302, an adder 304, a delay block 306, an integrator 308, and a threshold block 310. There is also shown an RS set input, an error signal $e_k$, an accumulator signal tt_loop_accum, a threshold input signal, a reset control signal reset_cntrl, and an output signal to_accum. The common receiver part 342 may comprise a timing generator 312, an RS extraction module or circuit 314, a channel estimation block 316, a receiver operations block (RXCVR) 318, a fast Fourier transform (FFT) block 320, a buffering block 330, a sampling bandwidth (BW) filter 332, and an analog-to-digital block 334. There is also shown an RF filter input, a slot timing input from PSS, an RS set output, a to_accum signal, an rs_strb signal, and a slot_strb signal.

The timing part 340 may comprise suitable logic, circuitry and/or code that may be enabled to extract timing information by processing an RS set of signals, which may generate an output to_accum that may control the timing generator 312, for example. The RS phase discriminator 302 may comprise suitable logic, circuitry and/or code that may be enabled to compare the timing of the RS set input signal with, for example, an input clock signal and may generate an error signal $e_k$.

The adder 304 may comprise suitable logic, circuitry and/or code that may be enabled to generate a weighted sum signal at its output, from a plurality of inputs. The delay block 306 may comprise suitable logic, circuitry and/or code that may be enabled to delay an input signal by a certain time interval, for example one or more sample periods. The delay block 306 may comprise suitable logic, circuitry and/or code that may be enabled to delay an input signal by a certain time interval, for example one or more sample periods.

The integrator 308 may comprise suitable logic, circuitry and/or code that may be enabled to generate an output that may be the integration of one or more input signals, and the integrator 308 may be reset by the reset_cntrl signal. The threshold block 310 may comprise suitable logic, circuitry and/or code that may be enabled to compare a threshold input signal with the tt_loop_accum input signal, and generate output signals reset_cntrl and to_accum. For example, when the tt_loop_accum signal may exceed the threshold level, the reset_cntrl signal may activate and reset, for example, the integrator 308.

The common receiver part 342 may comprise suitable logic, circuitry and/or code that may be enabled to receive radio frequency signals, and process these signals. The processing may comprise FFT computation, RS symbol extraction, channel estimation and other receiver signal processing. The timing generator 312 may comprise suitable logic, circuitry and/or code that may be enabled to generate timing signals for RS extraction, rs_strb, and slot timing, slot_strb. The signal slot_strb may be used to control FFT timing in the buffering block 330, for example. The module or circuit 314 may comprise suitable logic, circuitry and/or code that may be enabled to extract the RS symbols from the FFT module or circuit 320 output.

The channel estimation module or circuit 316 may comprise suitable logic, circuitry and/or code that may be enabled to estimate the wireless channel response for RS symbols, which may be desirable for receiver operations. The receiver operations module or circuit (RXCVR) 318 may comprise suitable logic, circuitry and/or code that may be enabled to measure and/or verify performance during receiver operations. The fast Fourier-transform (FFT) module or circuit 320 may comprise suitable logic, circuitry and/or code that may be enabled to generate a Fast Fourier Transform for an input signal. The buffering module or circuit 330 may comprise suitable logic, circuitry and/or code that may be enabled to interface with, for example, the FFT engine. The buffering module or circuit 330 may assist in, for example, dedicated processes, measurement processes, multimedia broadcast multicast services (MBMS), and/or SSS processing for hopping pattern determination. In some instances, each of the processes may be performed in parallel. The sample BW filter 332 may comprise suitable logic, circuitry and/or code that may be enabled to filter the signal at its input, and generate an output signal with limited bandwidth.

The analog-to-digital (A2D) module or circuit 334 may comprise suitable logic, circuitry and/or code that may be enabled to receive an analog RF-filtered signal and convert it to a digital signal representation at the output, with an arbitrary number of bits. The master timer 336 may comprise suitable logic, circuitry and/or code that may be enabled to provide basic timing functionality in the receiver. In some instances, the master timer 336 may count over 10 ms periods, and may be clocked at 30.72 MHz, for example. The master timer 336 may comprise a slot counter, and a sample counter. The input to the master timer 336 may be provided by an operating RF crystal, referred to as a TXCO, for example.

The common receiver part 342 may receive radio frequency signals, and process these signals. Processing may comprise FFT computation, RS symbol extraction, channel estimation and other receiver signal processing. Some timing aspects of the common receiver part 342 may be controlled by the timing part 340. For example, the symbol timing on one or more receiver subcarrier/carrier frequency, for example f1 and/or f2 as illustrated in FIG. 2, may be determined.

The RS phase discriminator 302 may receive at its input, a set of RS symbols, which may be extracted in the RS extraction module or circuit 314 to determine timing information about the RS carrying-carrier. The output of the RS phase discriminator 302 may be communicatively coupled to a first input of the adder 304. A second input of the adder 304 may be coupled to the output of the delay module or circuit 306, and the output of the adder 304 may be a weighted sum of its inputs. The delay module or circuit 306 may delay an input signal by a certain time interval, for example one or more sample periods. The delay module or circuit 306 may provide appropriate delay for the feedback signal provided to the adder 304 from the integrator 308.

An output of the adder 304, tt_loop_accum, may be communicatively coupled to a first input of the threshold module or circuit 310, and a first input of the integrator 308. A second input of the threshold module or circuit 310 may be coupled to a threshold-level defining signal. The threshold module or circuit 310 may compare a threshold signal with the tt_loop_accum signal, and generate output signals reset_cntrl and to_accum. For example, when the tt_loop_accum signal may exceed the threshold level, the reset_cntrl signal may activate and reset, for example, the integrator 308. In accordance with an embodiment of the invention, the to_accum signal, may increase at a rate that is a function of $\Delta t$, and may thus allow information about $\Delta t$ to be communicated to, for example, the timing generator 312, which in turn may control the FFT input window's position in the time domain. A second input to the integrator 308 may be set to a known, constant level, for example zero. The integrator 308 may integrate one or more input signals, and the integrator 308 may be reset by the reset_cntrl signal.

The analog-to-digital (A2D) module or circuit 334 may receive an analog RF-filtered signal and convert it to a digital signal representation at the output, with an arbitrary number of bits. The A2D 334 output may be communicatively coupled to an input of the sample BW filter 332. The sample BW filter 332 may filter the signal at its input, and generate an output signal with limited bandwidth and/or attenuate certain frequency bands. The output of the sample BW filter 332 may be communicatively coupled to a first input of the buffering module or circuit 330. A second input to the buffering module or circuit 330 may be communicatively coupled to the output signal slot_strb from the timing generator 312. The buffering module or circuit 330 may interface with, for example, the FFT engine. The buffering module or circuit 330 may assist in dedicated processes, measurement processes, multimedia broadcast multicast services (MBMS), and/or SSS processing for RS PN sequence determination. In some instances, each of the processes may be performed in parallel. The output of the buffering module or circuit 330 may be communicatively coupled to the FFT module or circuit 320.

The FFT module or circuit 320 may generate a Fast Fourier Transform for an input signal communicatively coupled from the buffering module or circuit 330. Similar to the buffering module or circuit 330, the FFT module or circuit 320 may assist in signal processing for dedicated processes, measurement processes, multimedia broadcast multicast services (MBMS), and/or SSS processing for radio time framing and RS PN sequence determination. A first output of the FFT module or circuit 320 may be communicatively coupled to a first input of the RS extraction module or circuit 314. The RS extraction module or circuit 314 may extract the RS symbols from the FFT module or circuit 320 output. In some instances, it may be desirable to use a generated hopping sequence from the demodulated base station signal and/or pseudo-noise (PN) covering for RS decoding. The RS symbols extracted and output at the RS extraction module or circuit 314 may be communicatively coupled to the input of the timing part 340, and a channel estimation module or circuit 316. The hopping pattern may be fed to the RS extraction module or circuit 314 via the rs_hopping_pattern signal on a second input, as illustrated in FIG. 3A. The RS extraction module or circuit 314 timing may be controlled via a third input signal rs_strb, communicatively coupled to an output of the timing generator 312.

The timing generator 312 may generate timing signal for RS extraction, rs_strb, and slot timing, slot_strb. The signal slot_strb may be used to control FFT timing in the buffering module or circuit 330. The timing generator 312 may generate the output timing signals for timing corrections and tracking. The master timer input signal may be communicatively coupled to the master timer 336 output. The master timer 336 may provide basic timing functionality in the receiver. In some instances, the master timer 336 may count over 10 ms periods, and may be clocked at 30.72 MHz, for example. The master timer 336 may comprise a slot counter, and a sample counter. The input to the master timer 336 may be provided by an operating RF crystal, a temperature-controlled crystal oscillator (TXCO), for example.

The channel estimation module or circuit 316 may estimate the wireless channel response for RS symbols, which may be desirable for receiver operations. The channel estimation output may be communicatively coupled to the RXCVR 318. The RXCVR 318 may measure and/or verify receiver performance functionality.

Figure 3B:
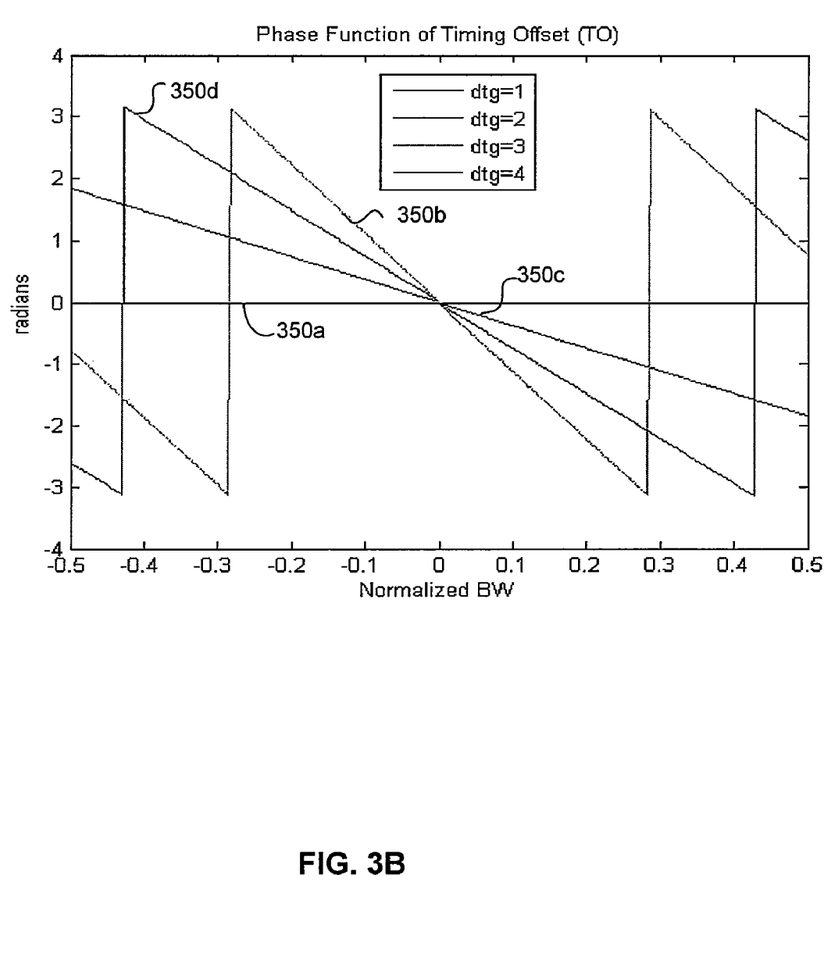
FIG. 3B is a diagram illustrating phase offsets for exemplary timing offsets, in accordance with various embodiments of the invention.

FIG. 3B is a diagram illustrating phase offsets for exemplary timing offsets, in accordance with various embodiments of the invention. Referring to FIG. 3B, there is shown a timing offset plot 350*a*, which may correspond to $\Delta t_g=1$; a timing offset plot 350*b*, which may correspond to $\Delta t_g=2$; a timing offset plot 350*c*, which may correspond to $\Delta t_g=3$; and a timing offset plot 350*d*, which may correspond to $\Delta t_g=4$.

From PSS and SSS slot markers may be obtained for the received signal to within the bandwidth of the PSS processing, for example. For the FFT to equalize channel selectivity, it may be desirable that the Cyclic Prefix (CP) may cover the delay spread of the channel. It may also be desirable to minimize the value of $\Delta t_g$ to avoid that the sampled input to FFT processing may comprise adjacent symbols (intersymbol interference—ISI) as this may degrade performance. However, $\Delta t_g$ may be tracked, and may provide guard against timing shifts due to mobility, for example.

It may be shown that for $\Delta t_g$ unequal to 1, a phase offset may be introduced into the FFT output, $\Delta t_g=1$ may correspond to no phase offset. This phase offset may be manifested by a complex multiplicative factor, z(k), applied to a subcarrier, and may be given by the following relationship, for a subcarrier k:

$$z(k)=e^{j(\Delta tg-1)\cdot (k-1)\cdot 2\pi/N}$$

where N may be the FFT size. When sampling the cyclic prefix, a timing offset may be manifested by a growing phase offset when indexed by tone frequency. For a RS tone, a received channel coefficient may be given by the following relationship:

$$hrx_k=z_k\cdot h_k+n_k$$

where $hrx_k$ may be a received channel coefficient affected by a phase offset z(k), $h_k$ may be a channel coefficient without phase offset, and $n_k$ may be a noise term. In FIG. 3B, various plots may illustrate a plurality of z(k), for different values of $\Delta t_g$, where timing offset plot 350*a* may correspond to $\Delta t_g=1$, timing offset plot 350*b* may correspond to $\Delta t_g=2$, timing offset plot 350*c* may correspond to $\Delta t_g=3$, and timing offset plot 350*d* may correspond to $\Delta t_g=4$. As illustrated in FIG. 3B, timing offset may introduce linearly decreasing phase as a function of frequency.

Figure 3C:
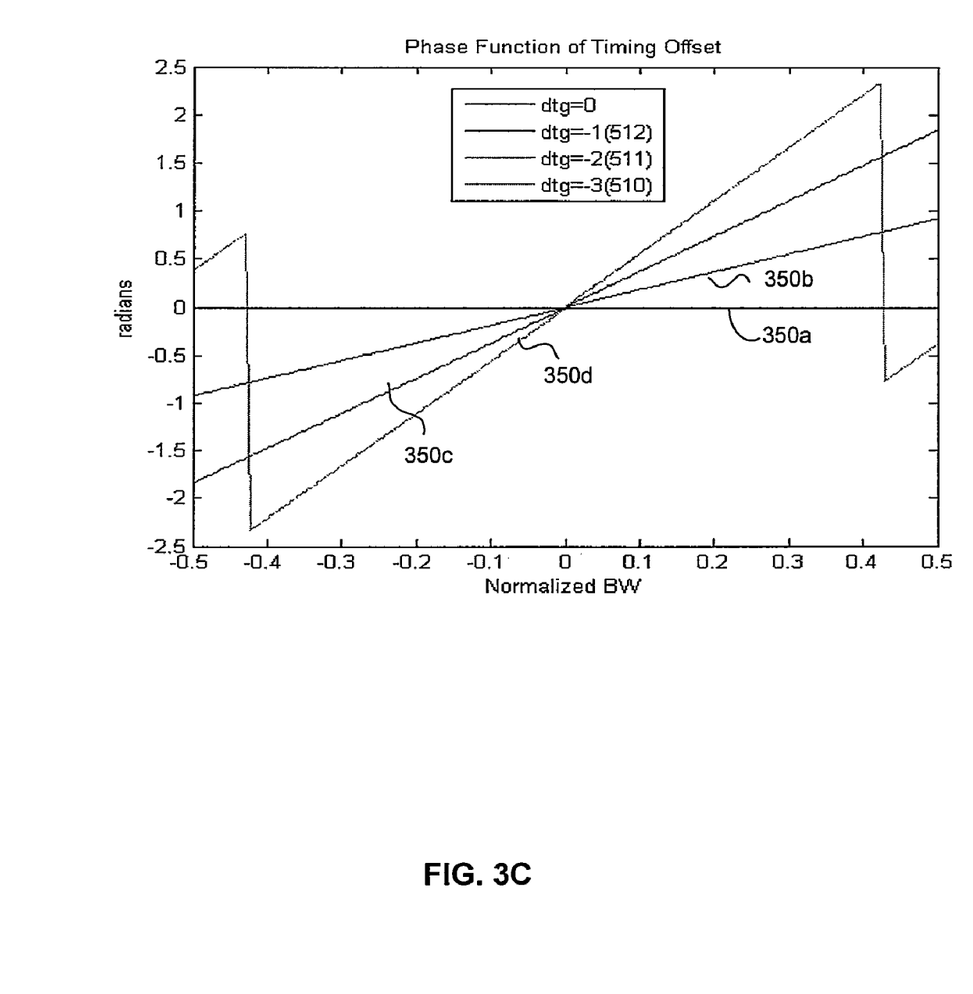
FIG. 3C is a diagram illustrating phase offsets for exemplary timing offsets by subcarrier, in accordance with various embodiments of the invention.

FIG. 3C is a diagram illustrating phase offsets for exemplary timing offsets by subcarrier, in accordance with various embodiments of the invention. Referring to FIG. 3C, there is shown a timing offset plot 352*a*, which may correspond to $\Delta t_g=0$; a timing offset plot 352*b*, which may correspond to $\Delta t_g=1$ for subcarrier 512; a timing offset plot 352*c*, which may correspond to $\Delta t_g=2$ for subcarrier 511; and a timing offset plot 350*d*, which may correspond to $\Delta t_g=3$ for subcarrier 510.

For $\Delta t_g>0$, the FFT may be sampled late, and a sampling timing adjustment may be desirable. As illustrated in FIG. 3C, for late sampling, timing offset may manifest phase offset across the bandwidth of the channel, as illustrated for a plurality of subcarriers by the plots 352*a*-352*d*. In some instances, the slope of the phase offset in function of the frequency may be linear with a positive slope for early sampled FFT, and a negative slope for late sampled FFTs, for example. An exemplary phase detector that may use adjacent RS tones per OFDM symbol may be given by the following relationship:

$$e_k = \frac{1}{N_t}\cdot \sum_{all\ tones(l),\ all\ antennas} imag(hrx_l\cdot hrx_{l+6}^*)$$

where a phase change between $hrx_l$ and $hrx_{l+6}$ (another RS tone, spaced 6 subcarriers apart, for example), may be averaged over all desirable tones, and all desirable antennas, which may be $N_t$ terms.

Figure 4:
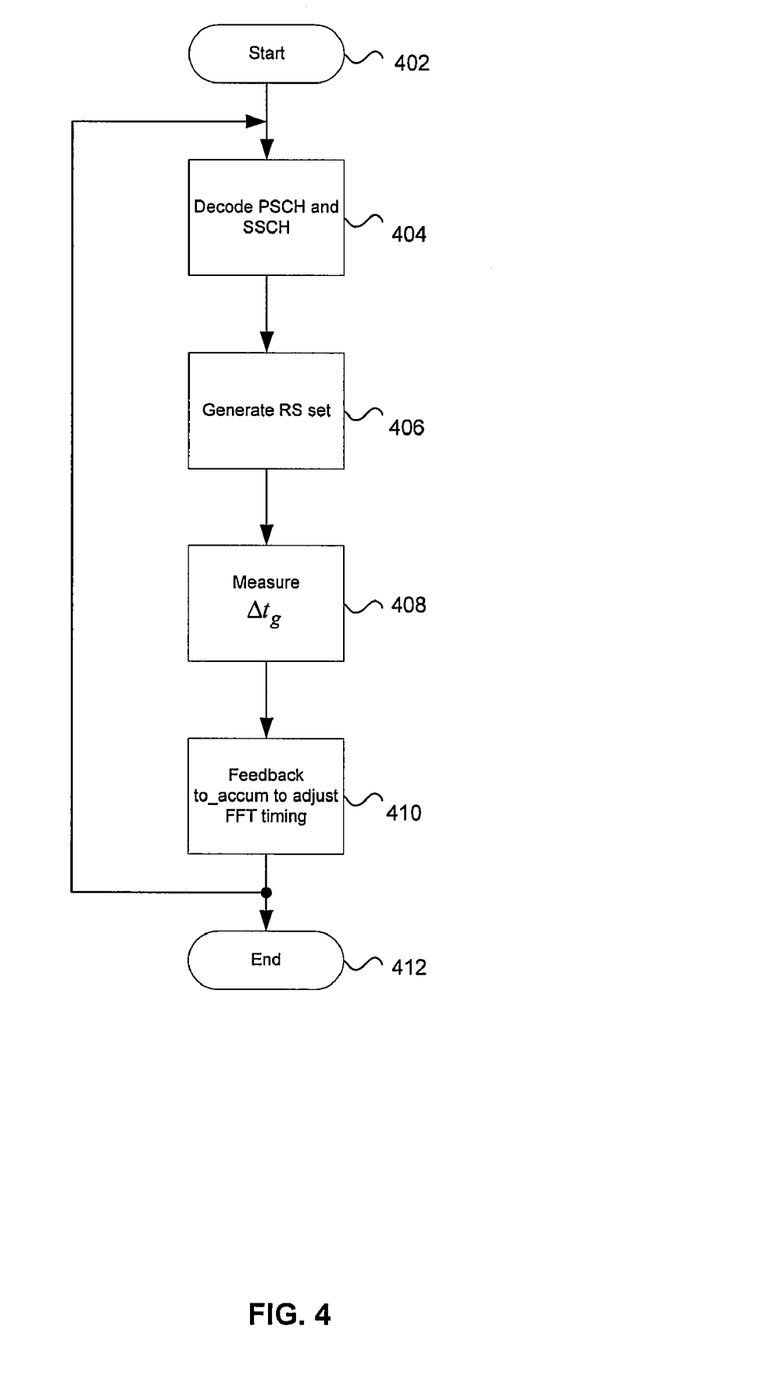
FIG. 4 is a flow chart illustrating an exemplary timing acquisition and tracking process, in accordance with an embodiment of the invention.

FIG. 4 is a flow chart illustrating an exemplary timing acquisition and tracking process, in accordance with an embodiment of the invention. After initialization in step 402, the primary and secondary synchronization signals, (PSS) and (SSS), may be decoded in step 404. The decoding of the PSS and SSS may provide coarse timing information for frame and slot synchronization, for example. Using the timing information, the FFT block 320, for example, may generate an FFT of a received signal. From this FFT, the RS extraction block 314, for example, may extract an RS set in the RS extraction block 314 in step 406. This RS set may be fed to the timing part 340. In step 408, the timing part 340 may track $\Delta t_g$ using the feedback loop depicted in FIG. 3A. Since the output signal to_accum may be generated as a function of $\Delta t_g$, the to_accum output signal from the threshold block 310 may carry information about $\Delta t_g$ to the timing generator 312. Thus, the output signal to_accum may enable tracking of the symbol timing, and adjust the timing of the receiver, for example in the timing generator 312. In step 410, the timing generator 312 may adjust the timing based on the input signal to_accum. The adjusted and tracked timing may be communicatively coupled from the timing generator 312 to the buffering block 330, where the timing of the FFT input window may be adjusted correspondingly.

In accordance with an embodiment of the invention, a method and system for a RS timing loop for OFDM symbol synchronization and tracking may comprise tracking symbol timing in an Orthogonal Frequency Division Multiplexing (OFDM) signal based on at least a reference symbol set, as described for FIG. 2 and FIG. 3A. A receiver timing, as described for FIG. 2 and FIG. 3A, may be adjusted based on at least the symbol timing.

The symbol timing may be tracked by generating an output signal as a function of a guard time $\Delta t_g$ in a phase discrimination feedback loop, for example timing part 340. The reference symbol (RS) set may be generated in an RS extraction module or circuit 314, from at least a fast Fourier transform of the received OFDM signal. The receiver timing may be coarsely adjusted and then finely adjusted, for example. The coarse receiver timing adjustment may be based on processing at least a primary synchronization signal and a secondary synchronization signal, as described for FIG. 3A. The reference symbol set may comprise a plurality of time-frequency slots. The plurality of time-frequency slots may change according to a frequency shift and pseudo-noise sequence that modulates the reference symbols. The OFDM signal may conform to a Universal Mobile Telecommunications Standards (UMTS) long-term evolution (LTE) signal. The adjustment of the receiver timing may be controlled via a receiver timing generator 312, for example.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for a method and system for a reference signal (RS) timing loop for OFDM symbol synchronization and tracking.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   tracking symbol timing in an Orthogonal Frequency Division Multiplexing (OFDM) signal based on at least a reference symbol set, said tracking comprising generating an output signal for timing offsets of said reference symbol set as a function of a guard time; and
   adjusting receiver timing based on at least said symbol timing.

2. The method according to claim 1, comprising generating said output signal for said timing offsets of said reference symbol set in a phase discrimination feedback loop.

3. The method according to claim 1, comprising generating said reference symbol (RS) set in an RS extraction block, from at least a fast Fourier transform of said received OFDM signal.

4. The method according to claim 1, comprising finely adjusting said receiver timing.

5. The method according to claim 4, comprising coarsely adjusting said receiver timing prior to said fine adjustment.

6. The method according to claim 5, comprising generating said coarse receiver timing adjustment based on processing at least a primary synchronization signal and a secondary synchronization signal.

7. The method according to claim 1, wherein said reference symbol set comprises a plurality of time-frequency slots.

8. The method according to claim 7, wherein said plurality of time-frequency slots changes according to a frequency shift and pseudo-noise sequence that modulates said reference symbol set.

9. The method according to claim 1, wherein said OFDM signal conforms with a Universal Mobile Telecommunications Standards (UMTS) long-term evolution (LTE) signal.

10. The method according to claim 1, comprising controlling adjustment of said receiver timing via a receiver timing generator.

11. A system for processing communication signals, the system comprising:
    one or more circuits in a receiver operable to, at least:
       track symbol timing in an Orthogonal Frequency Division Multiplexing (OFDM) signal, wherein said tracking is based on at least a reference symbol set, said tracking comprising generating an output signal for timing offsets of said reference symbol set as a function of a guard time; and
       adjust receiver timing based on at least said symbol timing.

12. The system according to claim 11, wherein said one or more circuits generate said output signal for said timing offsets of said reference symbol set in a phase discrimination feedback loop.

13. The system according to claim 11, wherein said one or more circuits generate said reference symbol (RS) set in an RS extraction block, from at least a fast Fourier transform of said received OFDM signal.

14. The system according to claim 11, wherein said one or more circuits finely adjust said receiver timing.

15. The system according to claim 14, wherein said one or more circuits coarsely adjust said receiver timing prior to said fine adjustment.

16. The system according to claim 15, wherein said one or more circuits generate said coarse receiver timing adjustment based on processing at least a primary synchronization signal and a secondary synchronization signal.

17. The system according to claim 11, wherein said reference symbol set comprises a plurality of time-frequency slots.

18. The system according to claim 17, wherein said plurality of time-frequency slots changes according to a time-frequency shift and pseudo-noise sequence that modulates said reference symbol set.

19. The system according to claim 11, wherein said OFDM signal conforms with a Universal Mobile Telecommunications Standards (UMTS) long-term evolution (LTE) signal.

20. The system according to claim 11, wherein said one or more circuits control adjustment of said receiver timing via a receiver timing generator.

21. A method for processing communication signals, the method comprising:
    tracking symbol timing in an Orthogonal Frequency Division Multiplexing (OFDM) signal based on at least a reference symbol set;
    adjusting receiver timing based on at least said symbol timing, said adjusting comprising finely adjusting said receiver timing and coarsely adjusting said receiver timing prior to said fine adjustment; and generating said coarse adjustment based on processing at least a primary synchronization signal and a secondary synchronization signal.

22. A method for processing communication signals, the method comprising:

tracking symbol timing in an Orthogonal Frequency Division Multiplexing (OFDM) signal based on at least a reference symbol set, said reference symbol set comprising a plurality of time-frequency slots that changes according to a frequency shift and pseudo-noise sequence that modulates said reference symbol set; and adjusting receiver timing based on at least said symbol timing.

23. A system for processing communication signals, the system comprising:

one or more circuits in a receiver operable to, at least:

track symbol timing in an Orthogonal Frequency Division Multiplexing (OFDM) signal, wherein said tracking is based on at least a reference symbol set;

adjust receiver timing based on at least said symbol timing, said adjustment comprising finely adjusting said receiver timing and coarsely adjusting said receiver timing prior to said fine adjustment; and generate said coarse adjustment based on processing at least a primary synchronization signal and a secondary synchronization signal.

24. A system for processing communication signals, the system comprising:

one or more circuits in a receiver operable to, at least:

track symbol timing in an Orthogonal Frequency Division Multiplexing (OFDM) signal, wherein said tracking is based on at least a reference symbol set, said reference symbol set comprising a plurality of time-frequency slots that changes according to a time-frequency shift and pseudo-noise sequence that modulates said reference symbol set; and adjust receiver timing based on at least said symbol timing.

* * * * *